United States Patent [19]

Portmann

[11] 3,815,007
[45] June 4, 1974

[54] DIRECT VOLTAGE CONVERTER, PARTICULARLY FOR USE IN TIME MEASURING INSTRUMENTS

[75] Inventor: Hubert Portmann, Saint-Imier, Switzerland

[73] Assignee: Compagnie des Montres Longines Francillon S.A., Bern, Switzerland

[22] Filed: Aug. 15, 1972

[21] Appl. No.: 280,863

[30] Foreign Application Priority Data
Aug. 26, 1971 Switzerland................ 12515/71

[52] U.S. Cl..................... 321/2, 331/112, 58/23 A
[51] Int. Cl. ................................................ H02m 3/32
[58] Field of Search........... 321/2; 331/112, 116 M; 318/128, 130, 132; 58/23 A, 23 AC

[56] References Cited
UNITED STATES PATENTS

| 2,854,614 | 9/1958 | Light | 58/23 AC |
| 3,328,657 | 6/1967 | Hetzel | 318/128 |
| 3,359,473 | 12/1967 | Negri | 318/132 X |
| 3,500,245 | 3/1970 | Parente | 331/112 |

FOREIGN PATENTS OR APPLICATIONS

| 1,014,165 | 8/1957 | Germany | 331/112 |

Primary Examiner—William M. Shoop, Jr.
Attorney, Agent, or Firm—Imirie and Smiley

[57] ABSTRACT

A direct voltage converter, particularly for use in electronic watches, having high efficiency and small size, the high efficiency being obtained by applying current pulses of very short duration compared with the pulse interval to the input of a transformer of which the output is rectified.

5 Claims, 1 Drawing Figure

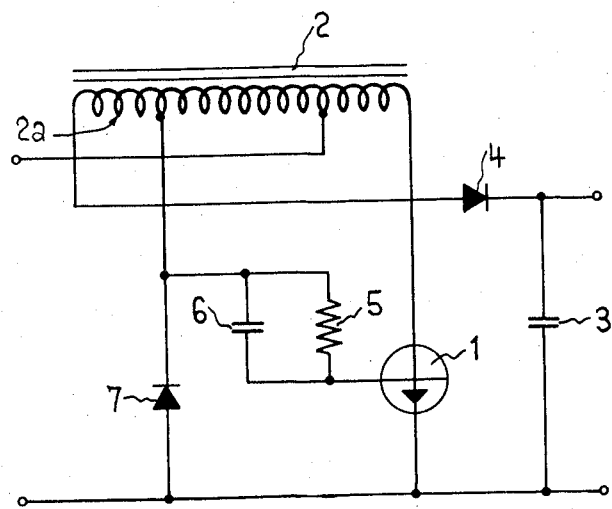

DIRECT VOLTAGE CONVERTER, PARTICULARLY FOR USE IN TIME MEASURING INSTRUMENTS

BACKGROUND OF THE INVENTION

This invention relates to a direct voltage converter, particularly for use in electronic watches or like small time measuring instruments.

In electronic watches, relatively high direct voltages are often required, particularly where a display or indication operates electronically, for instance by means of liquid crystals. Instead of providing a series of power source elements directly producing the required direct voltage, it is preferable to use a single element feeding a direct voltage converter. In this case replacement of a single element is cheaper than replacement of a series of elements and it is possible to use a standardized element generally available for electronic watches such as tuning fork watches or quartz watches.

However, a number of problems have to be solved when providing a direct voltage converter for watches and like small instruments. A transformer of very small dimensions has to be used. It is known that the loss in efficiency due to the small size of the transformer may be compensated by using a high operating frequency. However the losses of the commutation in the electronic circuit and the losses by Foucault-currents and due to stray capacities increase appreciably with increasing frequency, such that the use of a high frequency is not possible.

SUMMARY OF THE INVENTION

It is the primary object of this invention to avoid the disadvantages of the use of a high frequency but still to make use of the advantages resulting at high frequency. In accordance with this invention, these conditions may be fulfilled if the duration of current pulses fed to the input of a transformer is very short compared with the time interval between succeeding pulses. Such pulses of very short duration allow construction and design of the transformer as for a high frequency, but the low repeating frequency of the pulses causes little losses in the electric circuits of the converter. Therefore, a converter of small dimensions but high efficiency is obtained.

BRIEF DESCRIPTION OF THE DRAWING

The FIGURE is a schematic diagram of a preferred embodiment of the converter of the present invention.

DETAILED DESCRIPTION OF THE INVENTION

One embodiment of the invention will now be explained, by way of example, with reference to the accompanying drawing. This converter has an astable circuit usually known as a blocking oscillator. The circuit has one single active element, namely a transistor 1. The circuit oscillates when a direct voltage source is connected to the left-hand terminals due to feedback through transformer 2. Except for the feedback windings shown at the right-hand end of the transformer core, an additional winding 2a is provided for producing a relatively high secondary voltage, this voltage being rectified by means of a diode 4 and smoothed by a condenser 3. The drawing shows a transformer 2 having a tapped winding coil, in which the part between the extreme right end of the winding and the first terminal, which is connected with the source, is the primary, the part between this extreme right end and the second terminal is the feedback winding and the part between both of the extreme ends of the tapped winding is the secondary. The circuit also comprises a resistor 5, a condenser 6 and another diode 7. These elements, together with the feedback windings of the transformer 2 and the transistor 1 form a blocking oscillator capable of reaching a ratio between the duration of conduction of transistor 1 or pulse duration respectively and the interval between succeeding pulses in the order of 1:1000 or 1/100. During the pulse, that is during the conduction of transistor 1, the collector is shorted to the ground: the collector current increases and the base current charges the condenser 6 until the base potential which decreases with the charging of the condenser 6 reaches a value which is not sufficient for the required base current (the condition $I_c$ (collector current) $= h_{FE} I_B$ (base current) must be fulfilled). The collector current must decrease but this decreasing induces in the winding a reverse voltage which causes a negative voltage on the base of transistor 1 through the charged condenser 6: the blocking of the transistor 1 occurs very rapidly. During the interval between succeeding pulses, the condenser 6 is discharged relatively slowly through the resistor 5 until the base potential is again sufficient to open the transistor 1: at this moment a positive voltage is induced in the winding. This positive voltage is transmitted to the base and increases the opening rapidity. Then the process recurs. Consequently, the pulse duration is determined by the winding and the condenser 6 together, and the blocking time is determined by the RC-member formed with the condenser 6 and the resistor 5. The diode 7 gives a limitation to the reverse voltage appearing upon the winding 2 at the falltime of the pulse. In practice the duration of the pulses may be in the order of 1 to 100 µs while the pulse frequency is in the order of 100 to 1000 Hz or where the pulse interval or period is in the order of 1/100 to 1/1000 sec.

During the short pulses and during conduction of transistor 1 respectively, transformer 2 produces a relatively high voltage in its additional winding 2a, this voltage being rectified by diode 4 and stored in the smoothing condenser or filter condenser 3. During the pulse interval the transistor 1 is cut off and diode 4 prevents discharging of condenser 3 through the windings of transformer 2.

The elements of the illustrated circuit may be as follows:

| | |
|---|---|
| Primary winding | 20 turns |
| Secondary feedback winding | 40 turns |
| Supplementary winding 2a | 200 turns |
| Transistor 1 | BC 108 Philips |
| Diodes 4 and 7 | 1N 914 Phillips |
| Resistor 5 | 4.7 MΩ |
| Condenser 3 | 2.2 nF |
| Condenser 6 | 1 nF |
| Input voltage | 1.3 V |
| Output voltage | 13 to 14 V |
| Transformer core (ferrite ring), | |
| outer diameter | 4.5 mm |
| thickness | 1.0 mm |
| Transformer dimensions with windings | 5 × 4.5 × 1.5 mm |
| Efficiency | 50 % |
| Current consumption at 1.3 V | 10 µA |

Elements 1 and 3 to 7 may be produced and with any modern technique such as thin-layer technique or thick-layer technique. In any case the assembly of these elements may still be quite small, the main problem being to reduce the transformer dimensions. As indicated in the above table the transformer core may be an annular ferrite core having an outer diameter of 4.5 mm and a thickness of 1 mm. When the windings are applied to this core, the overall dimensions may be in the order of 5 × 4.5 × 1.5 mm. However, since winding of a closed core is relatively complicated, other types of cores of similar dimensions may be used. Particularly cores adapted to be assembled with a prefabricated system of windings, such as pot cores, may be used.

What I claim is:

1. A direct voltage converter adapted to be connected between a source of operating potential and a load and comprising: a transformer and an astable pulse-generating circuit in the form of a blocking oscillator for feeding input current pulses to said transformer; said blocking oscillator being energized by said source and including a transistor, a resistor-capacitor network, and a diode, one end of said network and said diode connected at a junction with said transformer and the other end of said network connected with said transistor for generating said pulses; and rectifier means at an output of the transformer to energize the load; said capacitor and said transformer cooperating to establish the duration of each pulse, and said capacitor and said resistor cooperating to establish the interval between successive pulses whereby said converter is adapted to produce pulses at a frequency in the order of $10^2$ to $10^3$ Hz with pulse durations in the order of 1 to 100 $\mu$s.

2. A converter according to claim 1, wherein the ratio between the duration of the pulses and the interval between succeeding pulses is in the order of 1:1000.

3. A direct voltage converter for an electric timepiece comprising at least one load device operating at a voltage exceeding 10 volts, a single-element direct-current source operating at a voltage in the order to 1 to 1.5 volts with reference to a reference terminal, a miniaturized direct-voltage converter connected between said source and said load device, said converter including a transformer in the form of a tapped winding coil and a rectifier in series, said transformer having a first end terminal, second and third intermediate terminals, and a fourth end terminal, the part between said first and second terminals being the primary, the part between said first and third terminals being a feedback winding, and the part between said first and fourth terminals being the secondary, an astable pulse-generating circuit including a transistor having its emitter connected with said reference terminal, its collector connected with said first terminal of said winding, said second terminal being connected with said source, its base connected with a resistance-capacitance network having its other end connected with said third terminal, a diode connected between said third terminal and the reference terminal, said transistor conducting when current passes through said transformer windings and said rectifier while the collector is shorted to the reference terminal producing a pulse which causes current from its base sufficiently to charge the capacitance of said network and terminate the base current, thence decreasing the collector current and the transformer winding current which in turn causes reverse voltage therein and a negative voltage on the base resulting in falltime of the pulse, said diode limiting the reverse voltage appearing in the transformer windings during said falltime of the pulse, said capacitance discharging through said resistance of said network whence potential of said base is sufficient to start the transistor conducting again, said converter producing pulses at a frequency in the order of $10^2$ to $10^3$ Hz with pulse durations in the order of 1 to 100 $\mu$s.

4. An electric timepiece according to claim 3, wherein a filter is connected across the output of the rectifier and the reference terminal.

5. An electric timepiece according to claim 3, wherein the ratio between the duration of the pulses and the interval between succeeding pulses is in the order of 1:1000.

* * * * *

UNITED STATES PATENT OFFICE
CERTIFICATE OF CORRECTION

Patent No. 3,815,007  Dated June 4, 1974

Inventor(s) Hubert Portmann

It is certified that error appears in the above-identified patent and that said Letters Patent are hereby corrected as shown below:

Assignee's address should read as follows:

Saint-Imier (instead of Bern)

Signed and sealed this 31st day of December 1974.

(SEAL)
Attest:

McCOY M. GIBSON JR.
Attesting Officer

C. MARSHALL DANN
Commissioner of Patents